(12) United States Patent
Stettner

(10) Patent No.: US 8,599,303 B2
(45) Date of Patent: Dec. 3, 2013

(54) DIMENSIONING SYSTEM

(71) Applicant: Roger Stettner, Santa Barbara, CA (US)

(72) Inventor: Roger Stettner, Santa Barbara, CA (US)

(73) Assignee: Advanced Scientific Concepts, Inc., Santa Barbara, CA (US)

( * ) Notice: Subject to any disclaimer, the term of this patent is extended or adjusted under 35 U.S.C. 154(b) by 0 days.

(21) Appl. No.: 13/657,610

(22) Filed: Oct. 22, 2012

(65) Prior Publication Data

US 2013/0286409 A1    Oct. 31, 2013

Related U.S. Application Data

(60) Continuation of application No. 12/571,866, filed on Oct. 1, 2009, now Pat. No. 8,294,809, which is a division of application No. 11/382,591, filed on May 10, 2006, now abandoned.

(60) Provisional application No. 60/679,579, filed on May 10, 2005.

(51) Int. Cl.
  *G03B 13/00* (2006.01)
  *G01B 11/00* (2006.01)
  *H04N 5/232* (2006.01)

(52) U.S. Cl.
  USPC .......................... 348/348; 356/627; 356/5.01

(58) Field of Classification Search
  USPC ............... 348/91, 169, 239, 345, 348; 356/3, 356/4.01–5.15, 625, 627, 636; 382/154; 250/332, 341.8; 235/462.14, 462.25, 235/479; 180/169
  See application file for complete search history.

(56) References Cited

U.S. PATENT DOCUMENTS

| | | | |
|---|---|---|---|
| 4,758,093 | A | 7/1988 | Stern et al. |
| 5,193,120 | A | 3/1993 | Gamache et al. |
| 5,446,529 | A | 8/1995 | Stettner et al. |
| 6,091,905 | A | 7/2000 | Yahav et al. |
| 6,133,989 | A | 10/2000 | Stettner et al. |
| 6,177,999 | B1 | 1/2001 | Wurz et al. |
| 6,300,613 | B1 | 10/2001 | Kuderer |
| 6,373,865 | B1 | 4/2002 | Nettleton et al. |
| 6,414,746 | B1 | 7/2002 | Stettner et al. |
| 6,493,079 | B1 | 12/2002 | Piacentini |
| 6,555,890 | B2 | 4/2003 | Dries et al. |
| 6,950,135 | B2 | 9/2005 | Mckee et al. |
| 7,139,024 | B2 | 11/2006 | Lu et al. |
| 7,453,553 | B2 | 11/2008 | Dimsdale |
| 7,527,205 | B2 | 5/2009 | Zhu et al. |
| 8,294,809 | B2 | 10/2012 | Stettner |
| 2005/0167575 | A1 | 8/2005 | Benz et al. |
| 2005/0285966 | A1 | 12/2005 | Bamji et al. |

FOREIGN PATENT DOCUMENTS

WO    9427166 A1    11/1994

*Primary Examiner* — Aung S Moe
(74) *Attorney, Agent, or Firm* — Gottlieb, Rackman & Reisman PC

(57) ABSTRACT

The present invention determines the dimensions and volume of an object by using a novel 3-D camera that measures the distance to every reflective point in its field of view with a single pulse of light. The distance is computed by the time of flight of the pulse to each camera pixel. The accuracy of the measurement is augmented by capture of the laser pulse shape in each camera pixel. The camera can be used on an assembly line to develop quality control data for manufactured objects or on a moving or stationary system that weighs as well as dimensions the objects. The device can also ascertain the minimum size of a box required to enclose an object.

24 Claims, 7 Drawing Sheets

DIMENSIONING SYSTEM

RELATED APPLICATIONS

This application claims priority to U.S. provisional application Ser. No. 60/679,579 filed May 10, 2005 and incorporated herein by reference.

BACKGROUND OF THE INVENTION

A. Field of the Invention

The present invention is a dimensioning system that rapidly measures the dimensions of the surface of any object having any size and shape. Not only can the dimensioning system determine the dimensions of box-like objects, but it can also determine the dimensions of irregular-shaped objects such as automobile tires on a conveyor belt.

B. Description of the Prior Art

In the packaging industry, the cost of shipping often depends upon both the dimensions of an object and its weight and the procedure for assessing the shipping cost is called dimming. Because of the high volume of packages shipped, errors are often made in calculating the cost. The proposed invention would perform this task automatically with high accuracy for each package. Even irregularly shaped packages could be rapidly measured. The 3-D object information would be translated into the relevant shape parameters and then combined with the package weight, if necessary, to compute the shipping cost from existing rate schedules.

A similar dimensioning procedure can be applied to manufactured objects on an assembly line. Acceptance or rejection can be determined by automatically comparing an object with a digitally stored 3-D reference shape. In addition, the invention can ascertain the minimum sized box needed to enclose an object on a conveyor belt. This application is useful if the conveyor is transporting many different objects each of which will be packaged individually.

The present invention is a 3-D camera system using, in part, the 3-D imaging technology disclosed in Stettner et al, U.S. Pat. Nos. 5,446,529, 6,133,989 and 6,414,746 that provides with a single pulse of light all the information of a conventional 2-D picture along with the third dimensional coordinates. It furnishes the 3-D coordinates of every reflective point in its field of view. The system is mechanically and optically configured so it is useful in assembly-line machine-vision applications in which the size and shape of objects must be rapidly and accurately established.

Several methods of ascertaining the dimensions of an object and the minimum size box needed to enclose objects on a conveyor belt have been developed. However, the prior art requires many light pulses to scan an object's surface with a mechanical mechanism while the present invention obtains all dimensions by simultaneously viewing the entire surface with a single light pulse and no moving components.

U.S. Pat. No. 6,177,999 discusses an optical scanning device which measures the height of a point on the object by directing the reflected light onto a linear CCD array as the object is swept past the device on a conveyor belt. The invention is contrived so that the height of the point corresponds to a unique pixel on the CCD. The object's contours are thus measured one point at a time.

U.S. Pat. No. 6,091,905 establishes the distance to an object by recording the total radiant energy reflected from an object during a specific length of time. A pulse of light is emitted having a pulsewidth equal to the time required for light to travel from the camera to the farthest object of interest in the scene being viewed and return to the camera. The camera observes the reflected light only during this interval. Nearby objects start reflecting earlier than farther objects and hence deliver more radiant energy to the camera during the observation interval.

U.S. Pat. No. 5,193,120 employs a video camera to image an object illuminated by many parallel lines of light simultaneously. The object's profile is enhanced by viewing the reflected light at an angle. The three-dimensional aspect of the object is derived from the image of the lines of light and the geometrical properties of the imaging system.

The system in International Publication Number WO 94/27166 calculates the height of a point on an object by measuring the time of flight required for a light beam to reflect back to the device from a point on the object. The invention moves above the object and establishes the minimum box size after many reflections.

U.S. Pat. No. 4,758,093 relies on a triangulation technique to find the surface contours of an object.

SUMMARY OF THE INVENTION

The present invention is comprised of a novel 3-D camera that measures the distance to every reflective point in its field of view with a single light pulse. In this application, "an object" can mean a single object or multiple objects. Using a lens, the camera images the object illuminated by the light onto a pixilated, electronic light sensitive detector called a focal plane array. The optics for collecting the reflected light may be a refractive telescope or reflective telescope. Each pixel converts the light into an electronic signal whose magnitude is sampled in time and stored in memory within the pixel. Each pixel also contains a clock that reports the time at which the samples are taken. This information is read out from the array into a dedicated computer that assesses when the light pulse arrived at each pixel and, hence, the elapsed time between the emission of the light and its reception. The measures of distances from the camera to everything in its field of view is then computed with the known speed of light or any other parameter by which the distances is determinable. The output of the 3-D camera is a three-dimensional image of the illuminated object, obtained from the measures of distances performed by the camera.

One objective of the invention is to measure the size, volume and weight of an object to compute accurately the cost of packaging or shipping. Another objective is to measure an object for quality control during manufacturing. A third objective is to find an object's dimensions to calculate the minimum size box needed to contain it. A fourth objective is to measure the dimensions of a large object as in surveying.

The camera furnishes a metrically accurate three-dimensional picture of the object characterized by a conventional two-dimensional image to which the third dimension is quantitatively added. Two such cameras located with the object between them will view all sides. Alternatively, if the object is resting on a plane surface such as a conveyor belt the dimensions viewed by one camera may be sufficient for quality control and packaging information. Objects with complex surfaces containing recessions may require that pictures be taken from additional positions if precise rendering of these features is needed.

Among the advantages of this device is its mechanical simplicity, the speed with which it can obtain data and its ability to measure objects of any size. Similar inventions require many light pulses to scan an object's surface with a mechanical mechanism while the present invention obtains all dimensions by simultaneously viewing the entire surface with a single light pulse and no moving components. Another advantage of the device is the enhanced third dimension accuracy stemming from sampling the reflected light to determine the returning pulseshape. Similar inventions ascertain the arrival time from the peak of the return signal or some other characteristic without making use of the detailed pulseshape information. The present invention is a staring laser radar for use in dimensioning systems.

Other advantages and uses of the invention will be apparent to those skilled in the art.

BRIEF DESCRIPTION OF THE DRAWINGS

FIG. 1 is a perspective drawing of the dimensioning system of the present invention measuring the dimensions of an object on a conveyor belt. The dimensioning system is comprised of a light source 4a, a novel 3-D camera 5, and a sampler/digitizer 6 which monitors the pulseshape of the light produced by 4a;

DETAILED DESCRIPTION OF THE PREFERRED EMBODIMENTS

The preferred embodiments are described with reference to the figures where like numbers denote the same elements.

Figure 1:
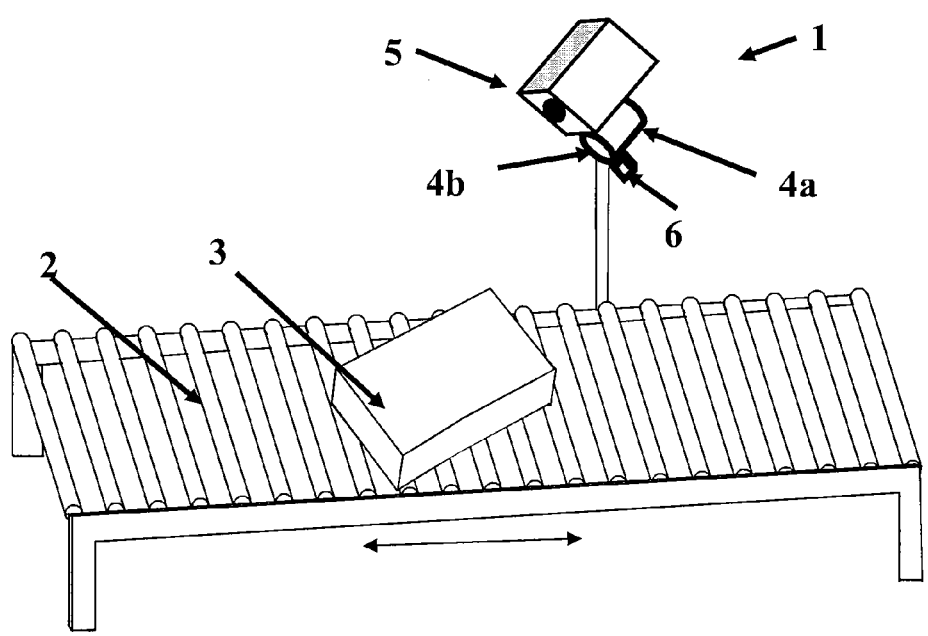

The present invention, depicted in FIG. 1, is a dimensioning system 1 designed to measure the size and dimensions of any object. It is comprised of a pulsed light source 4a, a beam shaping element 4b (a system to shape the projected light), a 3-D camera 5, and a photodiode/sampler 6. These latter four components are usually included in a single enclosure but are exposed here for clarity. In the figure, the object being dimensioned 3 is supported a conveyor belt 2.

Figure 2:
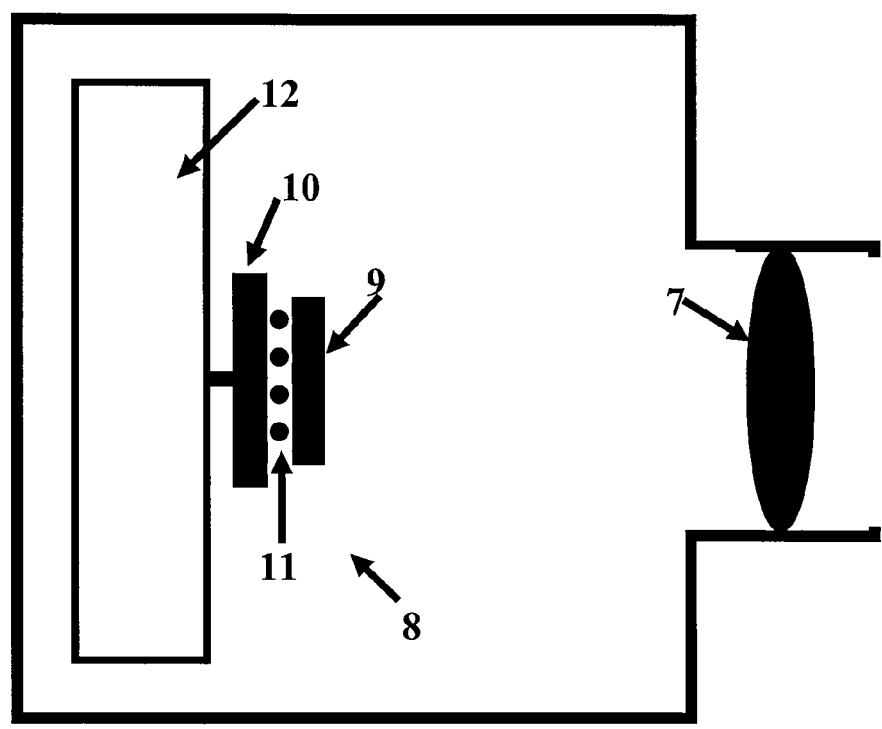
FIG. 2 shows the novel 3-D camera denoted by the number 5 in FIG. 1.

The components of the 3-D camera 5 are shown in FIG. 2. They are a lens system 7 which creates a real image of the object 3 on a focal plane array 8 and the circuit board 12 that generates the electrical signals needed to operate the focal plane array 8 and also process the data.

Figure 3:
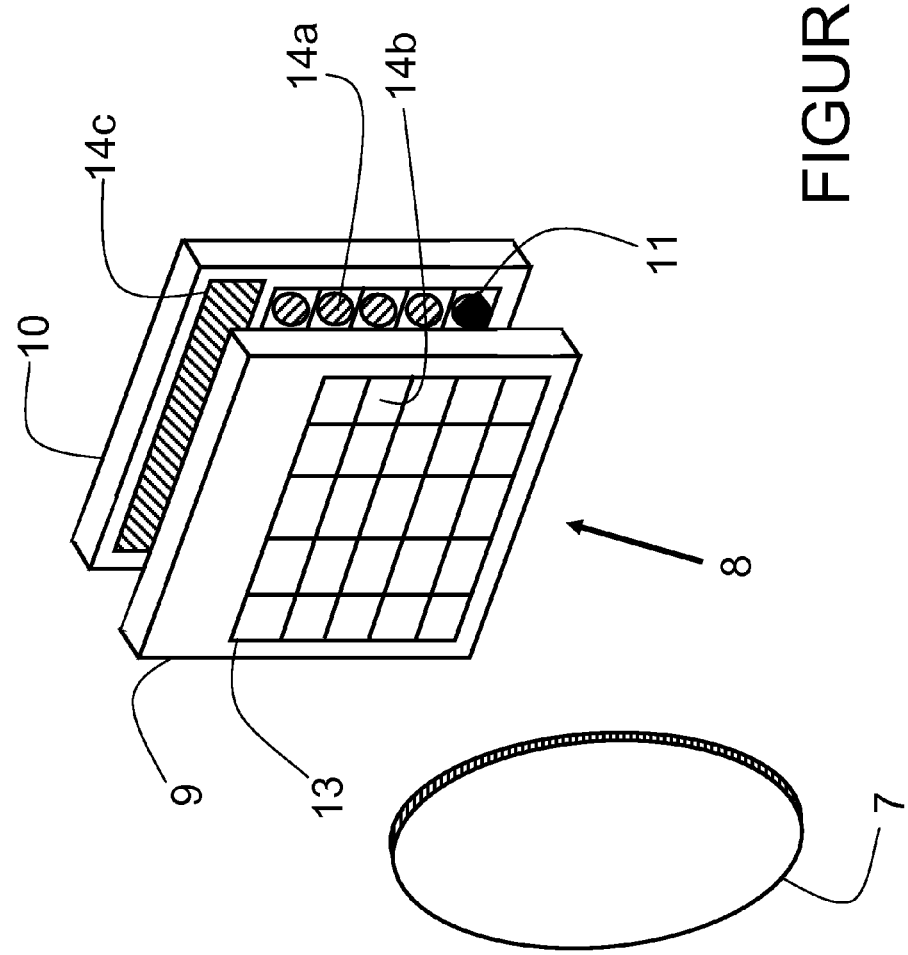
FIG. 3 shows the focal plane array denoted by the number 8 in FIG. 2.

FIG. 2 indicates the focal plane array 8 is composed, in one embodiment, of a light sensitive detector array 9 and an integrated electronic circuit chip called the readout array 10. FIG. 3 indicates the detector array 9 and the readout 10 are divided into pixels 13 and corresponding pixels (14a and 14b) on the readout array 10 and detector array 9 are electrically connected by a metallic bump 11. The pixel 14a on the readout array 10 is referred to as a unit cell and its circuitry is unit cell electronics.

Figure 4:
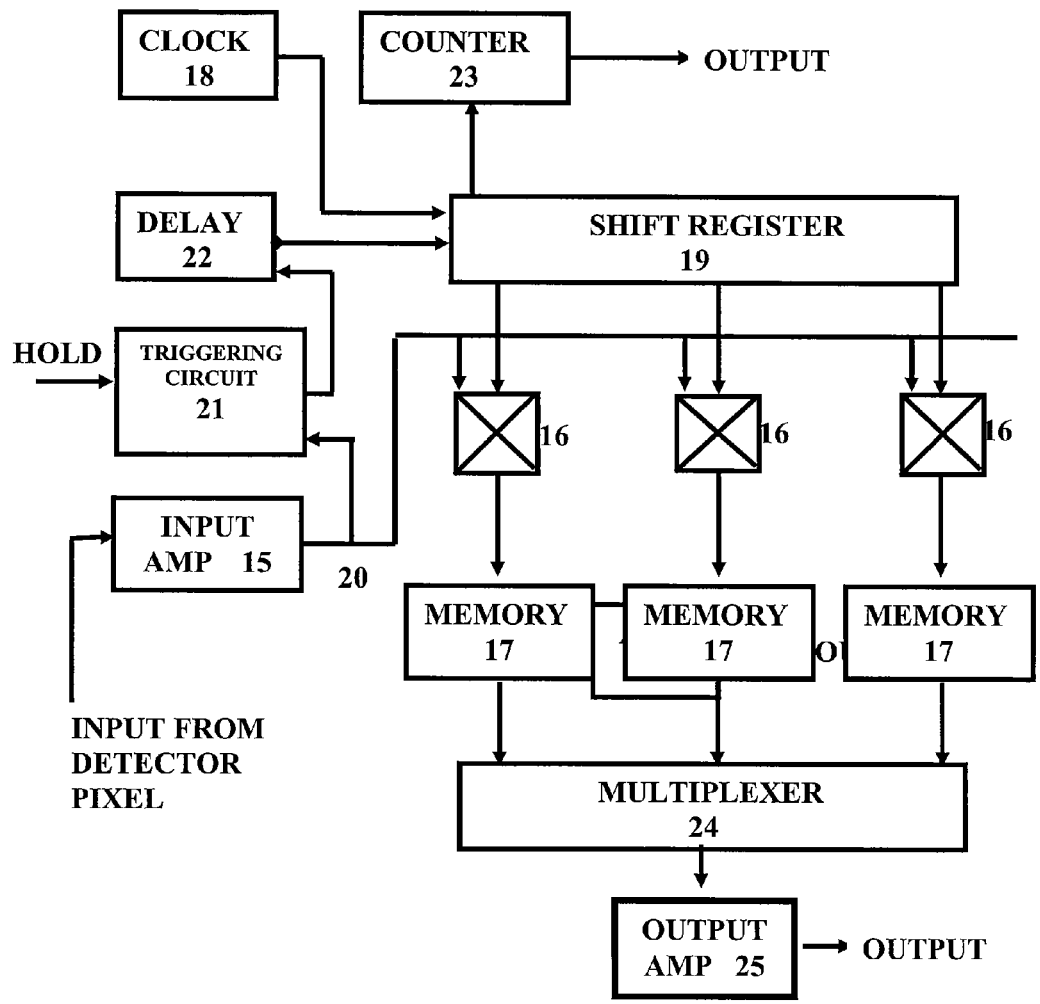
FIG. 4 is a block diagram of the electronic circuit in the integrated electronic circuit chip (the readout) denoted by the number 10 in FIG. 3.

The unit cell electronics 14a is diagrammed on FIG. 4. Each pixel 13 contains an input amplifier 15, a triggering circuit 21, a delay circuit 22, a shift register 19, a counter 23, and several switches 16 each connected to its own memory cell 17. Whenever the clock 18 (may not be located within the pixel) goes high, the shift register 19 shifts. The counter 23 counts the number of times the shift register 19 shifts. A multiplexer 24 connects to the unit cell output amplifier 25.

An additional multiplexer located on the readout 10 multiplexes the unit cell 14a signals to an output amplifier which drives the unit cell data off the readout 10. In an alternative embodiment, each pixel 13 does not contain a triggering circuit 21.

Figure 5:
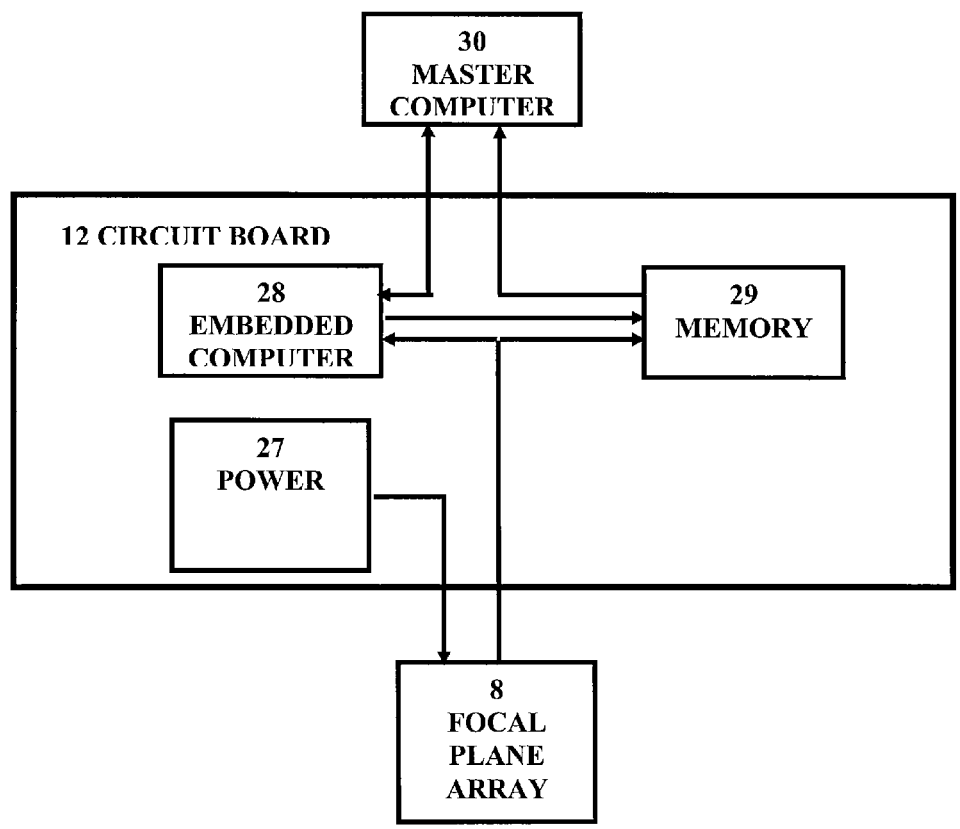
FIG. 5 is a block diagram of the electronic circuit on the printed circuit board denoted by 12 in FIG. 2.

A block diagram of the circuit board 12 is displayed on FIG. 5. The focal plane array 8 receives its power and the bias voltages needed to run it from power supply 27. The embedded computer 28 generates the clock signals for the focal plane array 8 and the memory 29. Data from the focal plane array 8 is partially (or completely) processed in the embedded computer 28 before being sent to the memory 29 and master computer 30 which completes the processing, stores the results and may display the acquired three-dimensional image. The master computer 30 also permits the operator to communicate with the circuit board 12 and, indirectly, the focal plane array 8.

Figure 6:
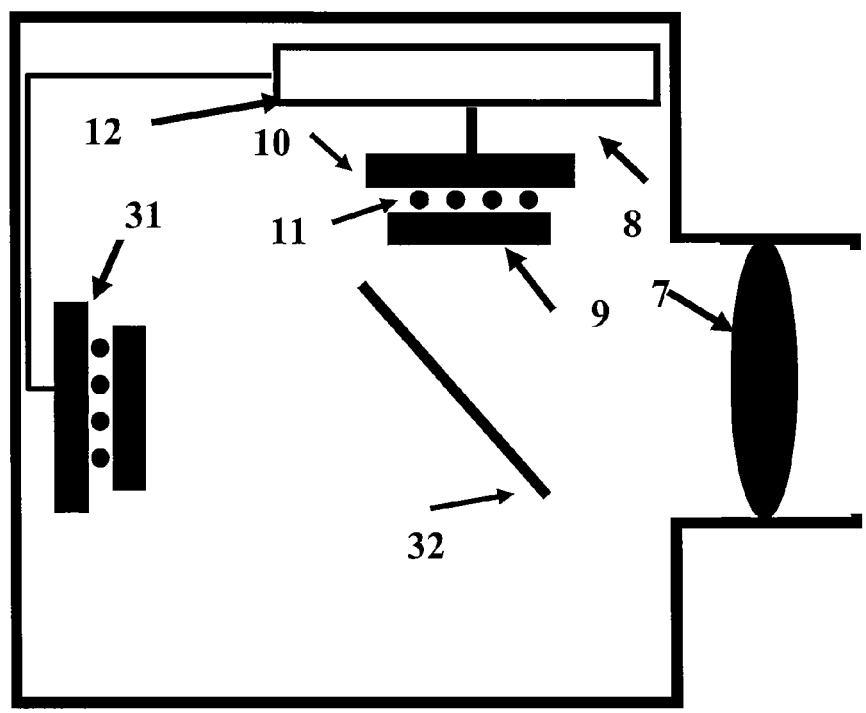
FIG. 6 is an alternative embodiment of the novel 3-D camera denoted by the number 5 in FIG. 1.

FIG. 6 illustrates an alternative embodiment of the electronic camera 5. A lens system 7 creates an image of the object 3 which is focused by means of the beamsplitter/mirror 32 on a focal plane array 8 and a conventional two-dimensional imaging device 31 such as a CCD array or a two-dimensional CMOS focal plane array. The two-dimensional focal plane 31 has sufficient resolution to read printed information on the object 3 such as a label or a coded package number.

In operation objects 3 may be moving along a conveyor belt 2. Light pulses are emitted from the light source 4a through the beam shaping element 4b, either at programmed time intervals or in response to the detection of an object on the conveyor belt 2 by a simple mechanism such the breaking of a continuous light beam by the object. Typically the pulsed light source 4a is a laser. In addition to a pulsed laser, a laser diode or a monoblock laser may be used as the pulsed light source 4a. The beam shaping element 4b may be an optical beam expander (beam expansion optics) or it may be a diffuser. A desirable characteristic of the diffuser is that the light may be efficiently shaped to be the same as the focal plane array 8. The diffuser may produce a rectangular beam that has the same shape as the detector array 9. The pulsed light strikes the object 3 at many points on its surface, is reflected from the object 3, is collected by the lens 7, and focused on the focal plane 8. This sequence of events is very similar to an ordinary 2-D digital camera used with a flash bulb. The difference is that the 3-D camera 5 counts time in each of its readout array pixels, 14b, on its focal plane 8 as wall as generating other data which can be used to accurately calculate the distance to each point on the object 3 associated with each pixel 13. Generating the range data starts with detecting and sampling, in the photodiode/sampler 6, the outgoing laser pulse to the object 3. This essentially provides both a time zero reference for all the pixels and a laser pulse shape reference. If the laser pulse shapes are stable or high range accuracy is not necessary, sampling the outgoing pulse is not necessary. The reflected light generates a current in each detector pixel 14b, which enters the input amplifier 15 of each detector's unit cell electronics 14a. The bias voltages of the input amplifier 15, as most of the other components in each unit cell electronics 14a, are generated by the circuit board electronics 12.

The input amplifier 15 either amplifies the electrical signal current directly, as a current amplifier, or converts the electrical signal to a voltage as a resistive transimpedance amplifier. The signal then usually enters two parallels networks. One of these networks is a triggering circuit 21, typically a Schmitt Trigger with Memory, which changes state if the signal is large enough. This triggering function can be held from operating with a programmed signal from the circuit board electronics 12 for multifunction applications. The hold can be programmed to be released after a defined count or time or it can be held indefinitely. In other single-function designs the triggering circuit need not be present saving silicon real estate. Typically when the triggering circuit 21 is used, a delay circuit 22 is also used to delay action of the trigger pulse arising form the triggering circuit 21. The delay circuit 22 is typically programmed to have multiple values, which are selected through the circuit board electronics 12. The other output amplifier 15 parallel network is connected to an analog memory, which usually has more than one analog memory component 17. Typically each analog memory component 17 is a capacitor. If there are more than one analog memory component 17 the input to the analog memory is usually sequenced between analog memory components 17 by means of a shift register 19, which controls the connection to the analog memory components 17 through their associated switches 16. The shift register 19 is driven by a clock 18, which can be either on chip (on the readout array 10 included in the peripheral circuitry 14c) or off-chip. An on-chip clock is preferable for high frequency sequencing and in practice there are many choices of on-chip frequencies that can be selected though the circuit board electronics 12. If the input amplifier 15 is a current amplifier then the signal is integrated on the analog memory component 16; if the input amplifier 15 is a transimpedance amplifier then the input signal is a voltage and is sampled by the analog memory 17. Only three analog memory components 17 are shown in FIG. 4 although in the preferred embodiment the number is typically 3-128. Typically the analog memory components 17 are continually cycled by the shift register so they are always sampling or integrating the input until stopped by the triggering circuit 21 or stopped by a programmable counter located on the circuit board electronics 12 or on-chip in the peripheral circuitry 14c. That is after all memory cells have been filled the memory cells are overwritten as new data arrives. Consequently, the memory cells are always filled with the most recently sampled waveform data. If the programmable counter, which halts the shift register 19, is on-chip it is programmed through the circuit board electronics 12.

In other embodiments of the unit cell electronics 14a circuitry such as delta reset circuitry or correlated double sampling can be implemented to reduce the noise in the analog signals.

In one class of operations the triggering circuit 21 automatically stops the shift register 19 when it senses the reflected laser pulse and thereby samples the returning reflected laser pulse shape. The returning laser pulse contains information about the target. In this class of operations it is desirable to also have data representative of the time it took the laser pulse to leave the camera, reflect from the target and return to the target. Thus the triggering circuit also stops a timing circuit, which is part of the data output from the unit cell 14a and which is eventually processed into a 3-D image. An analog timing circuit using a ramp voltage and switched capacitor is taught in Stettner, U.S. Pat. No. 6,133,989 and a digital counter is disclosed in Stettner, U.S. Pat. No. 6,414, 746 B1. FIG. 4 illustrates a digital counter design where the counter 23 increases by one bit after each cycle though the shift register 19. This design allows minimal use of silicon real estate for the longest distances.

In another embodiment of the unit cell circuitry 14a design the counter 23 and the shift register 19 are run simultaneously by the same clock 18 and the shift register 19 does not drive the counter 23. In this latter embodiment the triggering circuit 21 stops both the shift register 19 and the counter 23 if the clock is not in each unit cell. In still another embodiment of the unit cell circuitry 14a the clock 18 only drives the counter 23 and the counter controls the memory cells 17 through a multiplexer, which is substituted for the shift register 19. In all embodiments utilizing a counter 23 the counter is read out through a shift register (not shown) which may be in the unit cell or in the peripheral circuitry. Typically the clock 18 is many GHz to MHz for 3-D imaging applications but can be as low as KHz for alternative two-dimensional imaging applications.

Once both the timing and pulse shape data is collected it is output from the readout array chip 10 for development into the 3-D data required for the application. If the timing data is digital counter data it is directly output as illustrated in FIG. 4. If the timing data is an analog signal representative of when the charging of a capacitor by a voltage ramp was stopped, then an output amplifier is used. The analog data representative of the pulse shape is output from the unit cell electronics 14a through an output amplifier 25. However the analog data must be first multiplexed by a multiplexer 24. Once the analog information is output from the unit cell electronics 14a it is output from the readout array chip 10 by an additional output amplifier located in its peripheral circuitry 14c. Clock signals to output the data are generated on the printed circuit board 12.

Once the data from a laser pulse is output to the circuit board electronics, typically it is processed to provide an accurate arrival time, and hence an accurate range or third dimension, and processed to find a peak signal. This data processing can occur in the embedded computer 28 of the circuit board electronics 12, in the master computer 30 or preprocessed in the embedded computer 28 of the circuit board electronics 12, and completed in the master computer 30. The processing algorithms include a matched filter or least squares fit of the outgoing laser pulse to the reflected pulse data. The outgoing pulse data can be data collected from the photodiode/sampler 6 or, if the pulse-to-pulse pulse shape is stable enough, from stored data. Other parameters concerning the object 3 characteristics, as represented in the reflected laser pulse shape can similarly be obtained.

After the 3-D shape of the object 3 has been determined it is combined with data representative of the color of the object, the temperature of the object 3, identification numbers on the object, obtained by other 2-D cameras 31, in the master computer 30 to develop the information required for the application. The camera generated information may be combined with digital object 3 weight information in the master computer 30. This information could be used to compute shipping costs, adjust billings, remove items from an assembly line etc.

In one embodiment, the light source 4 is a pulsed laser diode that creates a pulse with a pulsewidth of several nanoseconds. A very large object or an object at considerable distance from the camera may require a more powerful pulse from a high power laser. One very useful intermediate size laser is a monoblock (pseudo-monolithic laser with an intracavity optical parametric oscillator) described in U.S. Pat. No. 6,373,865 B1

The photodiode/sampler 6 converts the outgoing light to an analog signal which is sampled, digitized and forwarded to the embedded computer 28 and the master computer 30. The photodiode/sampler 6 monitors the pulse-shape, which is utilized in determining the arrival time of the returning light. In one preferred embodiment the photodiode/sampler 6 is comprised of a light sensitive photodiode, which responds to the light pulse wavelength and a sampling circuit with memory. Accuracy of the target distance increases with sampling frequency. One way of increasing the sampling frequency is to employ several light detectors, which are timed so that the pulse collected, are at interleaved positions. Alternatively differing lengths of fiber optic cables can be used for each of the light detectors, maintaining the same timing, so that the detection will be out of phase in each detector. It is advantageous to use many detectors with the same phasing so that they can be averaged reducing the noise and increasing the accuracy of the captured outgoing pulse shape.

In one preferred embodiment, the light sensitive or photon detector array 9 (FIG. 3) is an array of P-intrinsic-N (PIN) or N-intrinsic-P photodiode fabricated on a single semiconductor chip. Fully depleting each diode ensures that photoelectrons generated in a detector pixel 14b are conducted by the pixel's metallic bump 11 into the readout pixel (unit cell) 14a closest to it. In another embodiment, the light sensitive detector 9 is incorporated into the readout pixel 14a itself in a way known by those familiar with the art. This monolithic design eliminates the complexity of two chips (9 and 10) hybridized with metallic bumps 11. In another preferred embodiment of the present invention the light sensitive or photon detector array 9 is an avalanche photodiode (APO) array. These photodiode are normally operated at higher voltage than either a PIN or NIP photodiode and result in electron multiplication or gain within the detector. This is an advantage for detecting weak signals. The disadvantage is that noise is produced during the gain process resulting in a noise factor, which will reduce the signal-to-noise ratio (SNR) for sufficiently strong signals. U.S. Pat. No. 6,555,890 B2 teaches that a PIN and APD can be produced in combination, in the same pixel, and selectively used depending upon the signal strength circumstances, or, in other words an avalanche photodiode can be made together with a corresponding ordinary PIN or NIP photodiode so that either detector can be used to detect photons, depending on the circumstances and the signal-to-noise ratio requirements. In another preferred embodiment of the current invention the light sensitive or photon detector 14b is an APO combined with a PIN detector in the same pixel.

Figure 7:
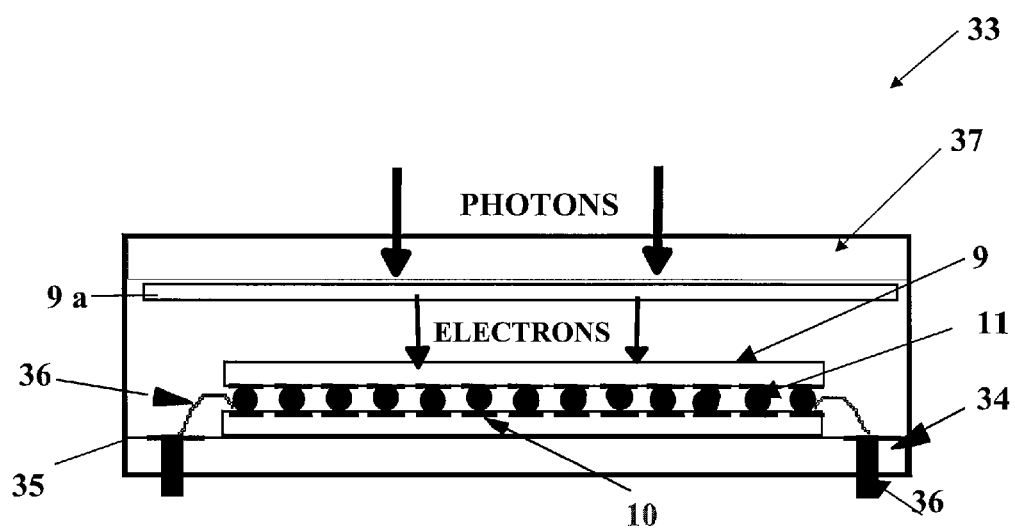
FIG. 7 is an alternative embodiment of the focal plane denoted by the number 8 in FIG. 3.

In another preferred embodiment of the current invention the focal plane array 8 with its two hybridized arrays 9 and 10 are incorporated in an image tube 33 (FIG. 7), wherein the actual light sensitive or photon detector 9a is a photocathode. In this latter embodiment photons pass through the window 37 and generate photoelectrons in the photocathode 9a. The photoelectrons are accelerated from the photocathode 9a to the photon detector array 9 except that under these circumstances the detector array 9 collects the photoelectrons not photons; the photoelectrons are amplified in the detector array 9 by impact ionization. The advantage of this embodiment over the embodiment that uses an APD is that the noise factor is greatly reduced, approaching one, and the amplification is much greater than the APD. Thus the amplified signal of an image tube results in a large SNR even it the signal is large.

Yet other embodiments of the photon detector may be an InGaAs avalanche photodiode, an avalanche photodiode made from a semiconductor material, a Digicon or an array of PIN or NIP semiconductor photodiodes. When the photon detector is an array of photodiode detectors, each detector may be electrically connected to the unit cell electronics on the readout chip by conducting bumps.

The processing readout chip may be composed of bulk silicon and silicon on EPI (epitaxial layer) CMOS components, or it may be composed of silicon on insulator components.

The photon detector tube may be an image tube where the light is converted to photoelectrons by a photocathode. The image tube photon amplification may be based on impact ionization of the photoelectrons in a semiconductor detector array or on impact ionization of the photoelectrons in a PIN, NIP or avalanche photodiode detector array. The image tube amplification may be based upon amplification of the photoelectrons in a microchannel plate and collection of the photoelectrons by an anode array.

In another image-tube 33 focal plane array 8 embodiment the detector array 9 is replaced by an anode array and a microchannel plate, provides the photoelectron amplification, and is inserted between the photocathode 9a and the anode array. In all image tube focal plane array 8 embodiments a single monolithic chip can be used with incorporates either the detector or anode feature in each readout pixel or unit cell. The advantage of the two-chip hybrid over the monolithic design is greater collection efficiency and more protection for the readout electronics from high energy particle damage. In all the image tube photon detection embodiments the electronic amplifier 15 may require only a small gain permitting the system to be highly linear, with large bandwidth, which both simplifies and improves the accuracy of the data analysis. In all the image-tube 33 embodiments a magnetic field can be imposed along the axis of the image tube decreasing the lateral movement of the photoelectrons in their transit though the vacuum and thus increasing the spatial resolution. This later configuration is called a Digicon.

In one preferred embodiment the readout array 10 is an electronic integrated circuit fabricated on a single piece of silicon. In another preferred embodiment the readout array 10 is an electronic integrated circuit fabricated with silicon on insulator (SOI) technology. In yet another preferred embodiment the readout array 10 is an electronic integrated circuit fabricated with silicon on EPI (epitaxial layer) technology.

It is very useful to adapt the processing readout chip to complete a processing cycle during a time interval of less than 20 ns and to reset in a time interval of less than 10 ns in preparation for the next light source pulse. The processing readout chip may also have a delta reset circuit or correlated double sampling circuitry for enhanced signal to noise ratio.

FIG. 4 is a block diagram of the electronic components of the readout unit cell 14a. In one preferred embodiment, sampling begins and the counter 23 starts counting when the light pulse is emitted. The amplifier output 20 is monitored by the trigger circuit 21 which outputs a signal to a delay circuit 22 when the amplifier output 20 reaches a pre-specified magnitude. After a preset time delay, delay circuit 22 stops the shift register, which terminates the sampling. A counter 23 counts the number of times the shift register has shifted. In another preferred embodiment, sampling is begun when a signal is input to the readout from the circuit board 12. In another preferred embodiment the action of the trigger circuit 21 is held and sampling is stopped when a signal is input to the readout from the circuit board 12 or the readout array chip peripheral circuitry 14c.

In one embodiment the unit cell input amplifier 15 can be a resistive transimpedance amplifier wherein the current from the detector pixel 14b is converted to a voltage and the sampling is voltage sampling and there is not signal integration. In another embodiment the input amplifier 15 can be a current amplifier wherein the current from the detector pixel 14b is amplified and/or conditioned; the sampling is still voltage sampling but the signal is actually integrated on the memory 17. In both these embodiments the amplifier can be linear or may be linear for part of its range and then non-linear for very large amplitude signals. The non-linearity of the amplifier near the end of its range serves to prevent amplifier saturation from near objects or highly reflective objects.

FIG. 5 is a block diagram of the drive and output electronics circuits on the printed circuit board 12. The drive electronics furnishes the voltages to supply power and biases 27 to the readout 9 and detector 10. All clock signals are generated by the embedded computer 28. These include the signals to initiate data acquisition, regulate raw data output from the focal plane array 8, and set options such as the clock frequency 18 and delay time 22. Some of the data analysis is accomplished by the embedded computer 28 whose program is referred to as firmware. In one preferred embodiment the embedded computer 28 is a field programmable gate array. The data and the results of the analysis inside the embedded computer 28 are stored temporarily in memory 29. A master computer 30 controls the circuit board, processes and stores the data output to it and may displays a picture of the 3-D scene with data overlays from one or more two-dimensional focal planes 31 to enhance the discrimination of the object 3 features. The program of the master computer 30 is referred to as software.

In many applications information printed on the object such as labels and bar codes must be read. In one embodiment this is done with ambient light which makes a conventional, two-dimensional image on the focal plane array 8. Every memory cell 17 in a unit cell 14a has this image stored in it and it can be readout as a two-dimensional image before the laser pulse data is collected. These two dimension images can be added to increase the signal to noise ratio. In another embodiment, the ambient light is supplemented by a flood light. FIG. 6 illustrates a third embodiment, which uses a second imager 31 (e.g. a charge coupled device or a conventional CMOS light integrating focal plane array for an infrared focal plane array) to record the two-dimensional image. The advantage of this embodiment is that the two-dimensional focal plane, usually has a smaller pixel than the 3-D focal plane 8 and can therefore have a much higher spatial resolution than the 3-D focal plane for reading small labels; this can reduce the cost of the overall system, and both the 2-D and 3-D images are generated simultaneously. Another advantage of this latter embodiment is that the 2-D image can be a full color image (or an infrared image) and can be digitally overlaid on the 3-D image for enhanced feature identification. Typically the pulsed light source is a laser with only one wavelength. The beam splitter 32 reflects the pulsed light's wavelength to the focal plane array 8 and transmits the visible light toward the second imager 31.

Many applications require the weight of the object to be measured. In one embodiment this is accomplished by supporting the conveyor belt 2 on a scale (not shown) comprised of springs or piezoelectric actuators.

The distance to the target is $$D = \frac{c}{2}(T_{arrival} - T_{start})$$

where c is the speed of light in the medium, $T_{start}$ is the time at which the pulse is emitted, and the counters start counting (or the voltage ramp begins) and $T_{arrival}$ is the time light arrives back at the pixel. $T_{arrival}-T_{start}$ is approximately the number of counts in the counter 23 multiplied by the clock 18 period. More accurately, it is the time elapsed between the emission of the pulse and the change of state of the Schmidt trigger plus the delay time metered by the delay circuitry 22. This estimate may be improved by fitting the sampled pixel waveform with the waveform of the outgoing pulse sampled by the photodiode/sampler 6. If the noise is small, this technique can yield $T_{arrival}$ with an accuracy much smaller than the clock 18 period itself.

The pulseshape fit may require correction of the outgoing waveform for amplitude, the orientation of the reflecting surface of the object, the individual response of the pixel's amplifiers and the individual characteristics of each memory cell 17. The least squares algorithm or matched filter algorithm may furnish the beet values of these parameters as well as the pulse's arrival time at the pixel. Error due to electronic noise and random fluctuations of the transmitting medium and variations in the outgoing waveform can be reduced by averaging data from many light pulses. An alternative embodiment of the readout electronics permits the averaging to be done on the readout array 10.

For many applications where a 3-D image of an object is required no knowledge of the position of the object is necessary by using the triggering circuit 21 function in FIG. 4. The Schmidt Trigger automatically stops the counter and shift register when it senses a return pulse. However if the object is semitransparent and it is desirable to obtain a 3-D image of both the outer and inner surfaces there may not be enough Memory cells 17 to capture more than the return from the first surface. Under these circumstances the Schmidt Trigger 21 in FIG. 4 can be held and the clock stopped after a programmed time; this would allow two consecutive light pulses to capture information both from the transparent surface and the surface behind it. In another embodiment critical parts of the Readout unit cell circuitry in FIG. 4 are repeated so that more than one consecutive return can be detected with a single laser pulse.

In an alternative embodiment several images are taken from slightly different camera positions so that the image area viewed by each pixel is somewhat altered. The resulting increase in data will result in a more accurate assessment of the object's dimensions.

A single camera can only view part of an object. To view all sides, it is necessary to rotate the object, change the camera position or employ two or more cameras. A system of mirrors can also be arranged to view all sides with a single photograph.

Although the invention has been described in terms of particular embodiments, the embodiments are merely illustrative of an application of the principles of the invention. Numerous modifications may be made and other arrangements may be devised without departing from the spirit and scope of the invention.

The invention claimed is:

1. An optical dimensioning system with a field of view for measuring the dimensions of a reflective object positioned within said field of view, the system comprising:
   a pulsed light source;
   a beam shaping element for distributing power from said pulsed light source over said field of view;
   an optical sampler for sampling the output of said pulsed light source;
   an object positioning system; and a 3D camera including:
      a lens system for collecting pulsed light reflected from said object;
      a focal plane array having an array of light sensitive detectors, each detector producing an electrical pulse response signal from an incident pulsed light signal, each of said light sensitive detectors electrically connected by a metallic bump to a unit cell electrical circuit of a readout array, wherein said readout array has a clock connected to an array of unit cell electrical circuits; and
         wherein each unit cell electrical circuit includes:
         an input amplifier with an amplifier output connected to a plurality of switches, each switch connected to a memory capacitor;

a logic element with a plurality of sequenced outputs, each of said sequenced outputs connected to a control input of one of said switches, each sequenced output of said logic element adapted to turn one of said switches on and off upon a transition of said clock thereby producing an analog sample of said electrical pulse response signal;

a counter connected to said logic element for counting the number of said analog samples;

a trigger circuit with an output connected to said logic element, to terminate the analog sampling; and a multiplexer having a plurality of inputs;

wherein each of said inputs is connected to a memory capacitor; and wherein said multiplexer has an output connected to a global multiplexer residing on the periphery of said readout array;

a supporting circuit board having a power supply connected to said focal plane array and applying power and bias voltages to said focal plane array.

2. The dimensioning system of claim 1, wherein said logic element comprises a delay circuit and a shift register.

3. The dimensioning system of claim 1, wherein said optical sampler is a photodiode.

4. The dimensioning system of claim 1, wherein said optical sampler provides a time zero reference.

5. The dimensioning system of claim 1, wherein said optical sampler is adapted to capture a laser pulse shape reference.

6. The dimensioning system of claim 1, wherein said clock resides outside of said readout array on said circuit board.

7. The dimensioning system of claim 1, wherein said input amplifier is a transimpedance amplifier.

8. The dimensioning system of claim 1, wherein said analog samples capture the reflected laser pulse shape.

9. An optical dimensioning system with a field of view for measuring the dimensions of a reflective object positioned within said field of view, the system comprising:

a pulsed light source;

a beam shaping element for distributing power from said pulsed light source over said field of view;

an optical sampler for sampling the output of said pulsed light source;

an object positioning system;

a lens system creating an image of said object at a focal plane of said lens system; and a focal plane array positioned in said focal plane, said focal plane array including an array of light sensitive detectors, each detector producing an electrical pulse response signal from an incident pulsed light signal, each of said light sensitive detectors electrically connected by a metallic bump to a unit cell electrical circuit of a readout array, wherein said readout array has a clock connected to an array of unit cell electrical circuits, and wherein each unit cell electrical circuit includes:

an input amplifier with an amplifier output connected to a plurality of switches, each switch connected to a memory capacitor;

a logic element with a plurality of sequenced outputs, each of said sequenced outputs connected to a control input of one of said switches and adapted to turn one of said switches on and off upon a transition of said clock thereby producing an analog sample of said electrical pulse response signal;

a counter connected to said logic element for counting the number of said analog samples;

a trigger circuit with an output connected to said logic element to terminate the analog sampling; and a multiplexer having a plurality of inputs, and each of said inputs connected to a memory capacitor, said multiplexer further having an output connected to a global multiplexer residing on the periphery of said readout array; and a two dimensional imaging device.

10. The dimensioning system of claim 9, wherein said lens system further comprises a beamsplitter.

11. The dimensioning system of claim 9, wherein said two dimensional imaging device receives incident light through said lens system.

12. The dimensioning system of claim 9, wherein said two dimensional imaging device receives incident light through a beamsplitter.

13. The dimensioning system of claim 9, wherein a 2D image from said two dimensional imaging device is overlaid on a 3D image from said focal plane array.

14. An optical dimensioning system with a field of view for measuring the dimensions of a reflective object positioned within said field of view, the system comprising:

a pulsed light source;

a beam shaping element for distributing the power from said pulsed light source over said field of view;

an optical sampler for sampling the output of said pulsed light source, an object positioning system; and a 3D camera including:

a lens system for collecting pulsed light reflected from said object;

a focal plane array having an array of light sensitive detectors, each detector producing an electrical pulse response signal from an incident pulsed light signal, each of said light sensitive detectors electrically connected by a metallic bump to a unit cell electrical circuit of a readout array; and wherein said readout array has a clock connected to an array of unit cell electrical circuits; and wherein each unit cell electrical circuit includes:

an input amplifier with an amplifier output connected to a plurality of switches, each switch connected to a memory capacitor;

a logic element with a plurality of sequenced outputs, each of said sequenced outputs connected to a control input of one of said switches and adapted to turn one of said switches on and off upon a transition of said clock thereby producing an analog sample of said electrical pulse response signal;

a counter connected to said logic element for counting the number of said analog samples;

a trigger circuit with an output connected to said logic element to terminate the analog sampling; and a multiplexer having a plurality of inputs, each of said inputs connected to a memory capacitor, said multiplexer further having an output connected to a global multiplexer residing on the periphery of said readout array;

a supporting circuit board having an embedded computer connected to said readout array, receiving 3D image data from said readout array, and performing operations on said 3D image data.

15. The dimensioning system of claim 14, wherein said logic element comprises a delay circuit and a shift register.

16. The dimensioning system of claim 14, wherein said optical sampler is a photodiode.

17. The dimensioning system of claim 14, wherein said optical sampler provides a time zero reference.

18. The dimensioning system of claim 14, wherein said optical sampler captures a laser pulse shape reference.

19. The dimensioning system of claim 14, wherein said clock resides outside of said readout array on said circuit board.

20. The dimensioning system of claim 14, wherein said analog samples capture the reflected laser pulse shape.

21. An optical surveying system with a field of view for measuring the dimensions of a reflective object positioned within said field of view, the system comprising:
   a pulsed light source;
   a beam shaping element for distributing the power from said pulsed light source over said field of view;
   an optical sampler for sampling the output of said pulsed light source, and producing an electrical time zero reference signal; and
   a 3D camera including:
      a lens system for collecting pulsed light reflected from said object;
      a focal plane array having an array of light sensitive detectors, each detector producing an electrical pulse response signal from an incident pulsed light signal, each of said light sensitive detectors electrically connected by a metallic bump to a unit cell electrical circuit of a readout array; and
      wherein said readout array has a timing reference signal connected to an array of unit cell electrical circuits; and
      wherein each unit cell electrical circuit includes:
         an input amplifier with an amplifier output connected to a trigger circuit and to a timing circuit, said timing circuit using said timing reference signal to produce an elapsed time measurement output indicating the elapsed time between said time zero reference signal and a terminating signal produced by said trigger circuit within said unit cell, said trigger circuit adapted to detect the presence of an electrical pulse response signal, and having an output terminating signal which terminates the timing of the elapsed time measurement; and
         a unit cell output circuit adapted to output said elapsed time measurement, said unit cell output circuit further connected to a global multiplexer residing on the periphery of said readout array, and said global multiplexer adapted to both select a unit cell output and provide an elapsed time measurement as an output of said readout array;
      a supporting circuit board having an embedded computer connected to said readout array, said embedded computer receiving a plurality of unit cell elapsed time measurements from said readout array, and said embedded computer performing digital processing on said plurality of unit cell elapsed time measurements.

22. The surveying system of claim 21, wherein the timing reference signal is a clock.

23. The surveying system of claim 21, wherein the time zero reference signal is a pulse.

24. The surveying system of claim 21, wherein the optical sampler is a photodiode.

* * * * *